March 17, 1953  G. F. LASTOFKA  2,631,402
REFRIGERATED BAIT BOX

Filed July 22, 1949  2 SHEETS—SHEET 1

Inventor
George F. Lastofka

By Clarence A. O'Brien
and Harvey B. Jacobson
Attorneys

March 17, 1953      G. F. LASTOFKA      2,631,402
REFRIGERATED BAIT BOX

Filed July 22, 1949      2 SHEETS—SHEET 2

Inventor
George F. Lastofka

By Clarence A. O'Brien
and Harvey B. Jacobson
Attorneys

Patented Mar. 17, 1953

2,631,402

UNITED STATES PATENT OFFICE 2,631,402

REFRIGERATED BAIT BOX

George F. Lastofka, Minneapolis, Minn.

Application July 22, 1949, Serial No. 106,164

2 Claims. (Cl. 43—55)

This invention comprises novel and useful improvements in a refrigerated bait box and more specifically pertains to a portable container for carrying minnows and other live bait and which is provided with refrigerating means for retaining the bait in a fresh condition and sealing the contents of the box from the atmosphere.

The primary object of this invention is to provide an improved portable bait box for storing minnows and other live baits, as well as for receiving fish, in an improved manner.

A further object of the invention is to provide a bait box in conformity with the foregoing object, wherein the odors of the matter within the box are sealed from the atmosphere; wherein splashing of the liquids within the box is prevented, and wherein the fish or other contents of the box are retained in a fresh condition by the use of a refrigerating means.

A further object of the invention is to provide an improved bait box in which a removable refrigerant container is detachably secured to the box in a novel manner and is advantageously and removably carried by the cover of the box.

A still further object of the invention is to provide an improved refrigerating tray for use in bait boxes in which spilling of the content of the tray in either the open or closed position of the cover of the box is prevented.

Yet another object of the invention is to provide an improved bait box adapted to contain minnows, other bait or fish in a liquid in the box, together with a refrigerating tray carried by the cover of the box and mounted above the liquid, and further including the provision of means for causing the melting refrigerant to drip into the liquid for cooling the same, for increasing air circulation in the box, and by the dripping and splashing action upon the surface of the liquid for aerating the same and thereby prolonging the life of bait contained within the liquid.

And a final important object of the invention to be specifically enumerated herein is to provide an improved bait box in conformity with the foregoing objects which shall be of a heat insulated construction, and wherein the interior of the box may be conveniently divided into a plurality of compartments by the aid of removable and adjustable partition members.

These, together with various ancillary features and objects of the invention which will later become apparent as the following description proceeds, are attained by the present invention, a preferred embodiment of which has been illustrated by way of example only in the accompanying drawings, wherein.

Figures 1, 3:
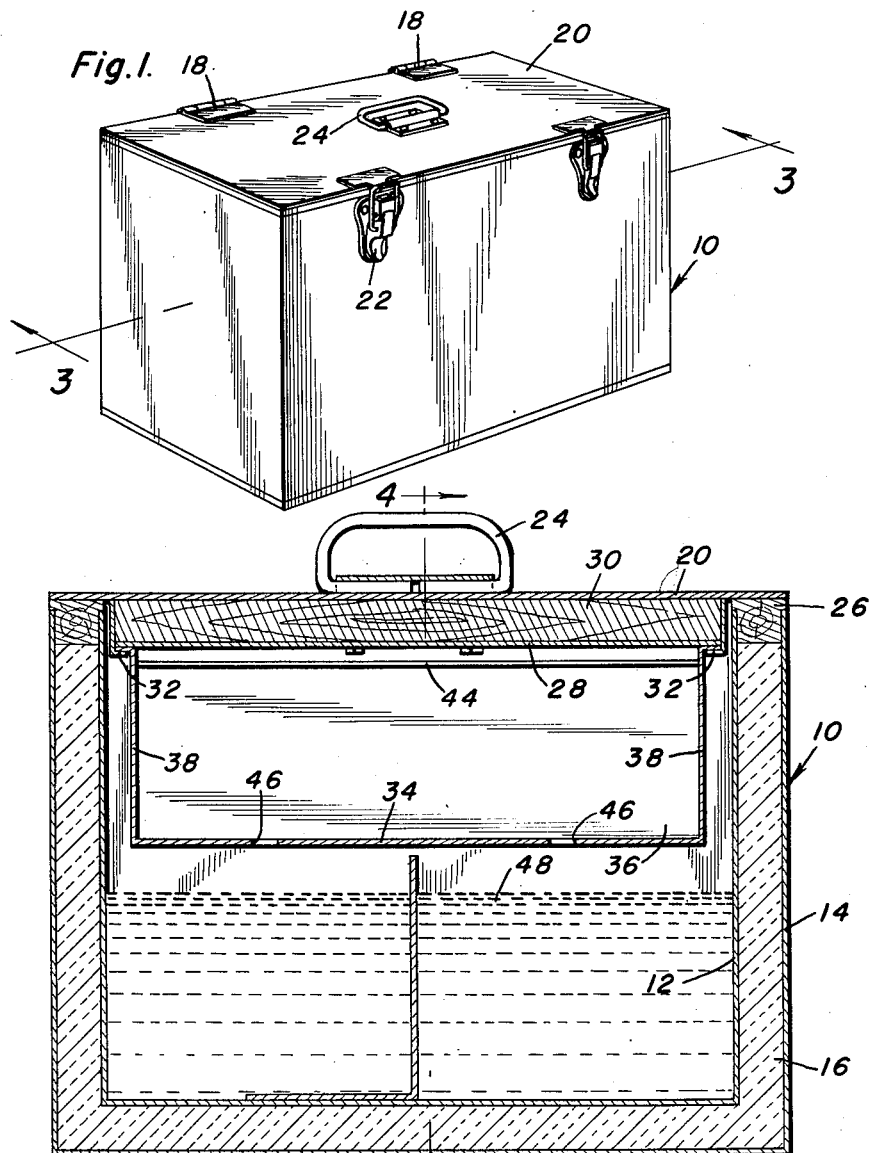
Figure 1 is a perspective view of a preferred embodiment of bait box in accordance with this invention, the same being illustrated in its closed position ready for transportation.
Figure 3 is a vertical central longitudinal view taken substantially upon the plane of the section line 3—3 of Figure 1 and showing the interior construction of the box.

Referring now more specifically to the accompanying drawings, wherein like numerals designate similar parts throughout the various views, it will be seen that the improved bait box forming the subject of this invention consists of a receptacle indicated generally by the numeral 10 and which may be of any convenient and suitable shape and material, and preferably consists of side walls and a bottom, the receptacle being open at its upper end.

Conveniently, the receptacle is of a heat-insulating construction and may comprise a metallic inner casing 12 received in a metallic outer casing 14, a lining 16 of any suitable insulating material being disposed therebetween. Hinged to the side walls of the receptacle, as by hinges 18, is a cover forming a closure for the device, this cover being of metal or any other suitable material. Suitable fasteners 22 of the so-called suitcase type, which may be of any desired construction, comprise latches by means of which the cover may be secured or locked in its closed position, whereby a handle 24 mounted upon the cover may be employed to transport the device.

Figure 4:
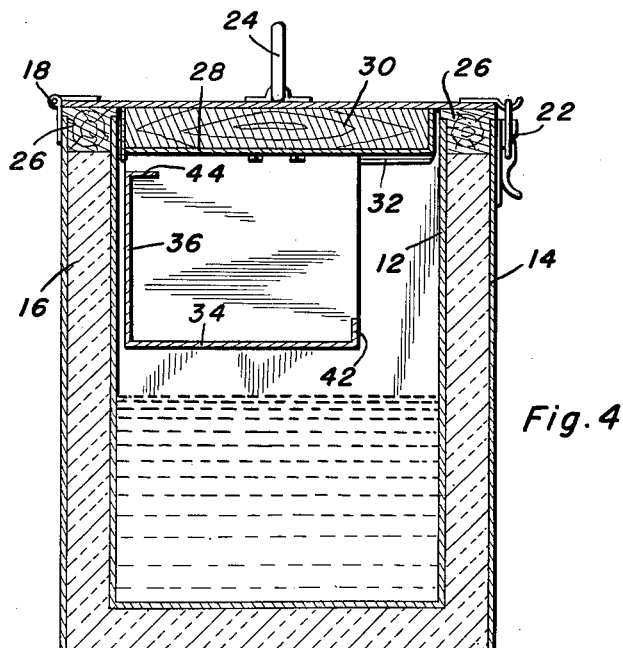
Figure 4 is a vertical transverse sectional detail view taken substantially upon the plane of the section line 4—4 of Figure 3.

As shown more clearly in Figures 3 and 4, the uppermost portion of the side walls, between the inner and outer casings 12 and 14, is provided with a wooden or other member 26 which is secured thereto and extended thereabove, and the peripheral portion of the inside of the cover 20 is adapted to close down upon and establish a sealing engagement with this wooden member.

Conveniently, the cover itself is insulated, being provided with a depending metallic casing 28 on its under surface within which is received a wooden block 30 or, if desired, any other more efficient heat-insulating material. It should be here noted that the proportions and dimensions of the depending member 28 are such that the same terminates in sufficiently close relation to the side walls of the box to effectively establish a seal preventing the splashing of the contents of the box between the joint formed by the upper surface of the members 26 and the lower surface of the cover 20.

A refrigerant containing tray of a novel construction is detachably secured to and depends from the portion 28 of the cover for positioning in the upper portion of the receptacle 10.

Figure 2:
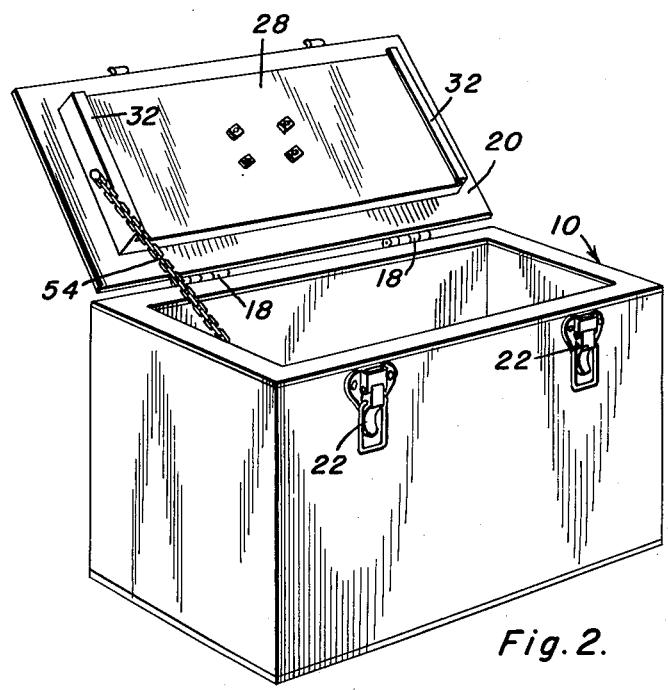
Figure 2 is a perspective view of the box of Figure 1 in its open position.

For this purpose, the depending member 28 is provided with parallel inwardly extending flanges 32, see Figures 2, 3 and 4, which constitute supporting flanges by means of which the refrigerating tray is slidably but removably supported and depends from the extension 28, and consequently the cover 20.

Figure 6:
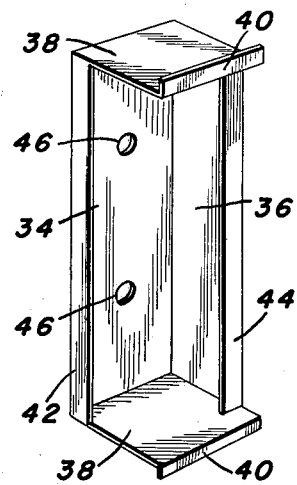
Figure 6 is a perspective view of the refrigerating tray forming an important feature of the invention.

The tray itself, as will be seen from Figures 3, 4 and 6, consists of a bottom wall 34 which is disposed in a horizontal plane when the cover is closed, together with an integral vertical side wall 36, these two walls being rigidly connected together and braced by parallel vertically disposed end walls 38, the latter at their upper ends being provided with outwardly turned flanges 40 adapted to be slidably received and supported in the above-mentioned inturned flanges 32. At their outer edges, the bottom and vertical walls 34 and 36 are provided with upturned flanges or rims 42 and 44 which form sides of the tray. The side wall 36 and flange 44 are spaced from the cover 20 to permit the passage of air between said cover and said side wall 36. The bottom wall of the tray is provided with a plurality of drain openings 46 by means of which a refrigerant, such as ice, or the like, received in the tray may be discharged and drip from the same into the liquid contained in the bottom of the receptacle 10 as the refrigerant melts.

As shown in Figure 3, it is contemplated that a liquid such as water or the like may be received within the lower portion of the receptacle 10, the same being filled to any desired level, such as that indicated at 48, with the bottom wall of the tray, 34, disposed above this liquid level when the cover is in its lowered or closed position as shown in Figures 3 and 4.

It should be here noted that the tray is of such dimensions that when the cover is in its closed position, as shown in Figures 3 and 4, the side and end walls of the tray are spaced from the corresponding walls of the receptacle 10 so that a sufficient air space is provided thereabout to permit circulation of the air within the receptacle.

Figure 5:
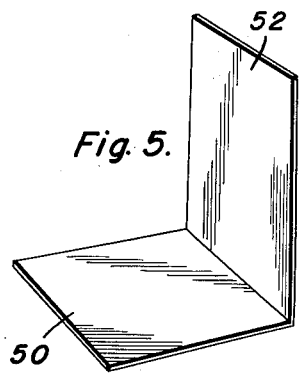
Figure 5 is a perspective view of one of the divider partitions forming a part of the invention.

It is further contemplated that one or more dividing partitions, such as disclosed in Figures 3 and 5 may be provided for dividing the lower interior of the receptacle into a plurality of compartments for receiving bait, fish or the like, these partitions being adjusted to vary the relative sizes of their compartments. For this purpose, a sheet metal plate or the like is provided having integral perpendicular walls 50 and 52 which respectively comprise a supporting base which rests upon the bottom of the receptacle and a vertically extending partition wall which extends between opposite side walls of the receptacle for dividing the interior thereof into a plurality of compartments.

Obviously, by merely adjusting the divider plates longitudinally of the receptacle, the relative volumes of the compartments formed therein may be varied as desired. Alternatively, the partition plates may be removed so that the entire interior of the receptacle may be employed as a single chamber for storing minnows, fish, or other bait.

In operation, it will now be seen that ice or the like may be placed in the receptacle, the same may be slidably secured to the supporting flanges 32, whereby the receptacle will be raised or lowered with the cover. In its lowered position, the flange 32, as shown in Figure 4, serves to prevent the ice or other refrigerant from being shaken from the tray and from dropping directly into the liquid contained in the bottom of the receptacle. However, the melting refrigerant will be discharged from the drain holes 46 in the bottom of the tray and will drip into the liquid. This dripping action of the refrigerant will not only serve to chill the contents of the receptacle, but by their agitation and splashing of the surface of the same will serve to aerate the liquid and thus permit the bait and fish to be kept fresh therein and to be kept alive for longer periods of time.

When the tray is raised to its open position shown in Figure 2, the chain 54 limiting this movement, the flange 44 will serve to prevent the passage of the refrigerant or of the melting products of the same from pouring out of the tray.

It is evident that the device may be employed not only as a bait box for containing minnows, other live bait or fish, but also may be employed as a portable refrigerating container for other purposes, since its heat insulating construction, its provision for air circulation, and its improved refrigerated tray construction all lend themselves to this purpose.

From the foregoing, the construction and operation of the device will be readily understood and further explanation is believed to be unnecessary.

However, since numerous modifications and changes will readily occur to those skilled in the art after a consideration of the foregoing specification and accompanying drawings, it is not desired to limit the invention to the exact construction shown and described, and accordingly all suitable modifications and equivalents may be resorted to, falling within the scope of the appended claims.

Having thus disclosed and described the invention, what is claimed as new is as follows:

1. In a refrigerated bait box, a cover, hinge means attaching said cover to the top of the box, a refrigerant container carried by said cover and depending therefrom into the interior of said box when in the closed position, said container comprising a unitary tray having a longitudinal horizontal bottom wall, a vertical side wall, transverse oppositely disposed end walls, said end walls joining said bottom and side walls, a longitudinal vertical flange disposed on one longitudinal edge of said bottom wall, the other longitudinal edge of said bottom wall being connected to the lower edge of said side wall, and a longitudinal horizontal flange disposed on the top edge of said side wall, the first mentioned flange being connected to said end walls and said bottom wall, said second mentioned flange being connected to said end walls and said side wall, and said bottom wall having a plurality of openings therein adapted to afford communication with the interior of the bait box.

2. The combination according to claim 1 wherein said side wall and second mentioned flange are spaced from said cover to permit the passage of air between said cover and side wall.

GEORGE F. LASTOFKA.

REFERENCES CITED

The following references are of record in the file of this patent:

UNITED STATES PATENTS

| Number | Name | Date |
|---|---|---|
| 93,904 | Rankin | Aug. 17, 1869 |
| 310,371 | Brown | Jan. 6, 1885 |
| 492,286 | Harris | Feb. 21, 1893 |
| 743,819 | Brown | Nov. 10, 1903 |
| 879,364 | Cohen | Feb. 18, 1908 |
| 1,500,007 | Sibbold | July 1, 1924 |
| 1,579,823 | Langguth | Apr. 6, 1926 |
| 1,593,123 | Harr | July 20, 1926 |
| 1,728,572 | Pearson | Sept. 17, 1929 |
| 2,024,648 | Kissling et al. | Dec. 17, 1935 |
| 2,038,218 | Holt | Apr. 21, 1936 |
| 2,137,705 | Tiefry | Nov. 22, 1938 |
| 2,143,213 | Reichle | Jan. 10, 1939 |
| 2,179,095 | Kelsey | Nov. 7, 1939 |
| 2,256,928 | Slack et al. | Sept. 23, 1941 |

FOREIGN PATENTS

| Number | Country | Date |
|---|---|---|
| 366,264 | Great Britain | Feb. 4, 1932 |